(12) United States Patent
Kokko (10) Patent No.: US 8,070,083 B2
(45) Date of Patent: Dec. 6, 2011

(54) METHOD AND APPARATUS FOR PROCESSING LOGS

(75) Inventor: Pekka Kokko, Hollola (FI)

(73) Assignee: Andritz Oy, Helsinki (FI)

( * ) Notice: Subject to any disclaimer, the term of this patent is extended or adjusted under 35 U.S.C. 154(b) by 349 days.

(21) Appl. No.: 12/293,948

(22) PCT Filed: Jan. 18, 2007

(86) PCT No.: PCT/FI2007/000017
§ 371 (c)(1),
(2), (4) Date: Jun. 18, 2009

(87) PCT Pub. No.: WO2007/107619
PCT Pub. Date: Sep. 27, 2007

(65) Prior Publication Data
US 2010/0025191 A1 Feb. 4, 2010

(30) Foreign Application Priority Data
Mar. 20, 2006 (FI) .................................... 20065181

(51) Int. Cl.
*B02C 13/00* (2006.01)
*B02C 17/02* (2006.01)
*B02C 23/08* (2006.01)
(52) U.S. Cl. ........... 241/68; 241/166; 241/301; 198/450
(58) Field of Classification Search .................... 241/68, 241/166, 301; 198/450
See application file for complete search history.

(56) References Cited

U.S. PATENT DOCUMENTS

| 1,892,670 A | 1/1933 | Jaeger |
| 3,019,882 A | 2/1962 | Pearson |
| 3,581,892 A | 6/1971 | Aro |
| 4,852,716 A * | 8/1989 | Roche ........................... 198/443 |
| 4,997,079 A | 3/1991 | Suopajärvi et al. |
| 5,119,930 A * | 6/1992 | Stelter ......................... 198/463.5 |
| 6,779,648 B2 * | 8/2004 | Woodham ................... 198/463.1 |

FOREIGN PATENT DOCUMENTS

| AT | 412 849 B | 8/2005 |
| AT | 412849 B | 8/2005 |
| CA | 2 299 479 | 8/2000 |
| DE | 2 235 536 | 1/1974 |
| DE | 2235536 A1 | 1/1974 |

OTHER PUBLICATIONS

International Search Report completed May 8, 2007.

* cited by examiner

*Primary Examiner* — Bena Miller
(74) *Attorney, Agent, or Firm* — Nixon & Vanderhye P.C.

(57) ABSTRACT

The present invention relates to a method of processing logs by means of an apparatus comprising a transportation level in the advancing direction (P) of the logs, where they are arranged to be transported in a position perpendicular to their advancing direction (P), and where orifice members going therethrough and extending in the advancing direction (P) of the logs. In the method, at least two support member units spaced from each other are arranged below the transportation level whereby each support member unit comprises at least one elongated support member, which is arranged rotatably parallel to the transportation level and perpendicular to the advancing direction (P) and protruding therefrom, and said axis of rotation each support member unit is adapted so that when rotating, the support members protrude through the orifice members above the transportation level whereby the logs are received in one or more receiving spaces formed between the support members protruding above the transportation level. The invention also relates to an apparatus for implementing said method.

19 Claims, 5 Drawing Sheets

METHOD AND APPARATUS FOR PROCESSING LOGS

CROSS RELATED APPLICATIONS

This application is the U.S. national phase of International Application No. PCT/FI2007/000017 filed 18 Jan. 2007 which designated the U.S. and claims priority to FI 20065181 filed 20 Mar. 2006, the entire contents of each of which are hereby incorporated by reference.

BACKGROUND OF THE INVENTION

The present invention relates to a method of and an apparatus for processing logs, which apparatus comprises a transportation level extending essentially in the advancing direction of the logs, upon which the logs are arranged to be transported in a position substantially perpendicular to their advancing direction, and which transportation level is provided with orifice members going therethrough and extending essentially in the advancing direction of the logs.

A new kind of processing method and apparatus is disclosed herein for both unbarked and barked logs, especially big size logs and other elongated wood material, which enables both a more efficient removal of loose material off the logs for further processing and a versatile processing arrangement for the logs.

When the logs are being handled, beginning from logging and via intermediate storing and transportation up to the wood processing plant, all kinds of loose material such as stones and sand, loose soil and other material is carried along, which have to be removed from the logs prior to further processing, e.g. barking. On the other hand, especially some hardwood species having a tough bark, e.g. eucalyptus, are typically barked in connection with logging. Logs barked in such a way carry with them—especially stuck onto their sticky surface—such loose material into the treatment line. In every case, after logging the logs are gathered and piled up on the ground along roadsides for further transportation. When loading the logs in cars, more soil sticks onto the logs.

During transportation, more dust and sand sticks onto the logs, especially barked logs. At the mill the logs are stored in wood yards, which by no means are always concrete or asphalt-based but ground-based, and from which loose soil again sticks onto the logs. Especially in case of barked logs, the log stream may further contain pieces of bark or in the worst case long and tough bark strips. Additionally, in countries with a cold climate, snow and ice containing sand and stones stick onto the logs, which then clog transportation devices for the logs or otherwise hamper their operation.

In view of the wood processing plants, however, it is important that all logs entering the plant are as clean as possible. This minimizes the number of excess handling phases for the logs at the plant and provides other advantages. For example, the quality of chips is improved and wood losses, as well as the overall operation and maintenance costs of the wood processing plant are decreased.

A further problem in wood/logs processing is that the logs coming from the plant's store to the processing line do not enter the processing line as a uniform flow but the feeding of the logs to the conveyors is irregular. The logs are brought to the conveyors directly from the store mainly in bundles by means of a truck loader or corresponding. Logs advancing on the conveyor more or less in form of bundles are discharged from the conveyor belt in bundles or piles, respectively.

For cleaning and transporting the logs, wood processing plants use e.g. grid and unscrambler solutions. In grid solutions, in which impurities are supposed to fall through the grid, the grids usually have to be arranged at a very sharp angle, when a grid construction is used alone. An adequate falling angle of the grid ensures that the logs advance in the treatment line as efficiently and reliably as possible. In known grid and other solutions, logs containing loose material may drop onto the transfer or processing level in piles, whereby stones and other soil material easily "ride" on top of the wood piles over the entire cleaning apparatus. The sharp angle of the grid further decreases the retention time of the logs on the grid and thus further facilitates the passing of stones and the like forward with the logs. Additionally, the known grid slope eventually gets filled with stones, sand, soil material, snow etc. A conventional grid may also get clogged by logs, which stay in vertical position on the grid, and thus cause a blockage, which at the worst requires stoppage of the whole line.

In known solutions, attempts have been made to remove stones and other soil material also with so-called step feeders and unscrambler solutions, where the bottom of the unscrambler has been provided with orifices, and by means of chain and rod feeders, also provided with orifices in the bottom. However, neither the unscrambler solutions nor chain and rod feeders are able to efficiently remove sand and other soil material stuck onto the individual logs. Clogging of the constructions is a further problem. Additionally, these solutions are expensive and their transporting capacity is limited. Using step feeders it is not possible to arrange such a log-transporting device, which would simultaneously act as an "active store", as a kind of regulation backup and buffer store in the log flow, but the logs are transported further more or less one by one.

Thus, a method and an apparatus has been invented, that in an embodiment, ensures a reliable transportation and treatment of logs and more efficient removal of loose material from the log flow. Another object is a construction of the apparatus that allows for a self-acting cleaning.

A feature of the log treatment apparatus disclosed herein is that logs are treated on a grid-like level forming a transportation level by means of elongated support members protruding thereabove and being arranged to rotate around their axis of rotation, which members both support the logs and push them forward and simultaneously actively clean especially the orifices of the grid-like level, through which loose material being removed from the logs is specifically arranged to be discharged.

The solution for log treatment disclosed herein offers numerous advantages. The log treatment solution allows a more efficient removal of stones, sand and other loose material off the logs. Simultaneously, the apparatus efficiently and reliably transports the logs to a subsequent transportation device or another device. Additionally, the support members acting as log transportation and processing members also act as cleaning members, which actively keep the grid orifices clean and carry the loose material away. Thus, the cleaning of the apparatus can be carried out during operation without separate cleaning operations requiring the stoppage of the apparatus. The feeding treatment apparatus may also be used as conveyor acting as "an active store" of logs, which simultaneously equalizes the log flow and allows for quick regulation of the log flow amount.

A further advantage of the apparatus disclosed herein is that it can always be adapted to a desired mode of operation, depending on the current situation, to perform the desired cleaning operations on the logs. An additional advantage of the apparatus disclosed herein is a very small space requirement and also easy retrofit between existing conveyors.

SUMMARY OF THE DRAWINGS

In the following, the invention and preferred embodiments thereof are explained in more detail with reference to the accompanying figures.

FIGS. 4a-4d are highly schematic illustrations of exemplary embodiments of the transportation level; FIG. 4a as a top view and the rest as side views.

Figure 1:
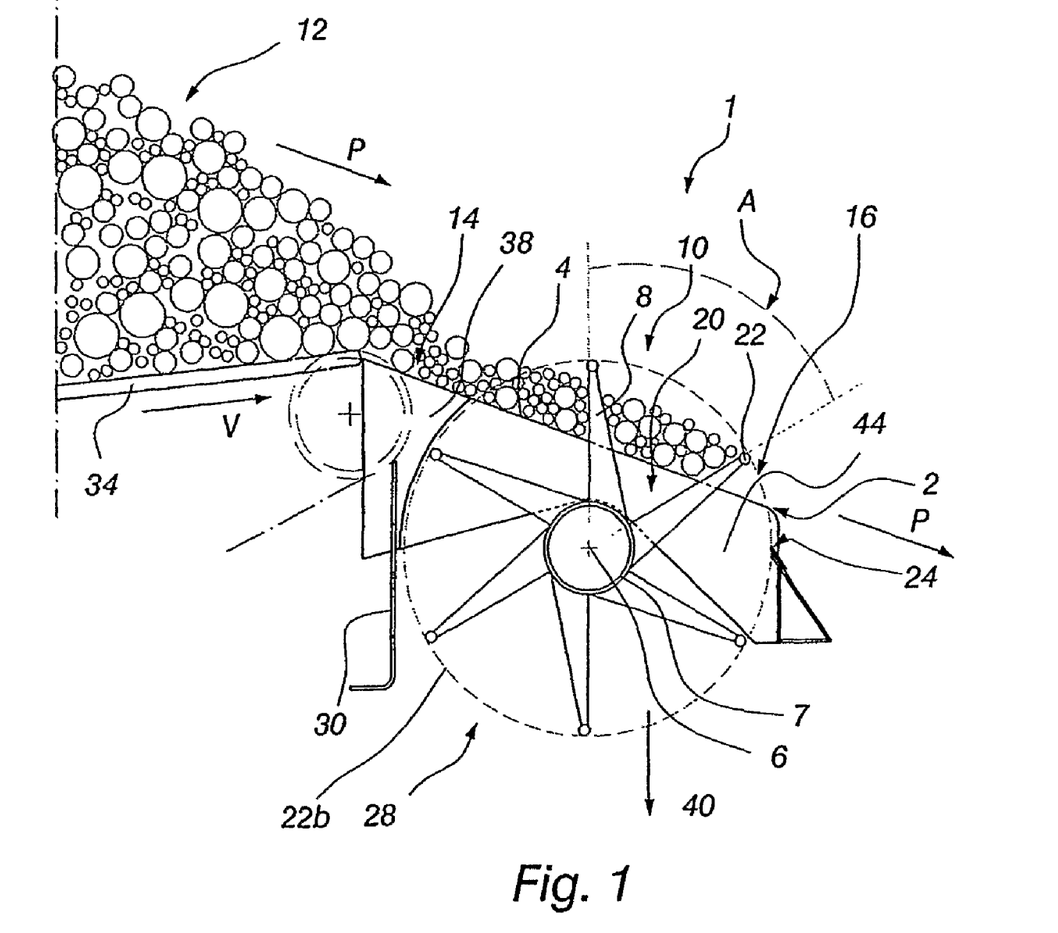
FIG. 1 is a schematic illustration in side view of one preferred embodiment of the processing apparatus.

FIG. 1 illustrates highly schematically an apparatus 1 for processing logs 12. A purpose of the apparatus 1 is to remove the loose material from the logs and to transport the logs in a controlled way further in the advancing direction in accordance with arrow P to a subsequent, in the figure right-handed and here not shown conveyor or other processing device. The logs are fed from a conveyor 34, from where they are often discharged in piles or bundles. Naturally, the feeding of the logs to the apparatus 1 may be effected using some other device. The logs 12 are fed to the apparatus 1 onto a transportation level 2 thereof, which comprises one unbroken or several separate support surfaces 4, which are preferably arranged to essentially one and the same level. The logs 12 being treated are fed onto the transportation level from the feed side 14 and discharged from the opposite discharge side 16, respectively.

Support member units 28 containing support members 8 arranged to rotate around an axis of rotation 6 are arranged below treatment level 2 acting as transportation level. The axis of rotation is here formed as an actual shaft member 7, which comprises one elongated rigid member, such as a hollow tube, shaft or e.g. roll extending through the whole apparatus 1 in the transverse direction thereof. In this embodiment, the support members 8 are arranged to extend from the axis essentially radially and thus they perform a rotating motion around the axis 6. Here, the direction of the rotating motion is perpendicular in relation to the longitudinal axis of the support member. The most essential thing is that the support member forms a protrusion in respect of the axis of rotation, the tip of which protrusion extends from the axis 6 to a radial distance.

The axis of rotation 6 is situated in such a way in respect of the level 2 that the tip 22 of the support member 8 protrudes above the level 2 from the elongated orifices 20 going through the level. Thus, the support member protrudes above the level 2 in a phase-angle area, where it points more or less towards the level 2. The support member 8 rises so as to protrude above the level 2 in the area 20a of the orifice 20 in the front side of the axis 6 and descends back down below the level in the area 20b. In practice, this means a phase-angle area of about 180°, but the phase-angle area may preferably be also larger. Here, phase angle refers to an angle changing in accordance with the rotating motion of the support member, i.e. the total phase angle area is 360°.

The transportation level 2 here contains elongated level members 44 arranged to extend in the advancing direction of the logs, the top support levels 4 of which together form the transportation level. As level members, e.g. flat bars or the like rigid plate-like members may be used. Between two of these adjacent level members 44 an orifice member 20 is formed extending through the transportation level, adapted to which orifice member the support member 8 can rotate around the axis 6 simultaneously extending above the level 2. An orifice member 20 here refers to both individual orifices and orifices communicating with each other e.g. via slots or openings arranged between the level members 44 or in the level members themselves. At least most of the orifices 20 extend essentially in the advancing direction of the logs. The orifices 20 may also extend perpendicularly in relation to the advancing direction of the logs, when the logs being processed are of great length. The orifices 20 of the orifice member may have a closed circumference, or an open circumference, in which case the orifice member is slot-like.

The support members 8 are arranged in support member units 28, in all of which a group of support members extends most suitably essentially perpendicularly in respect of the axis of rotation 6 or essentially radially or tangentially in respect of the shaft 7. Preferably the support members are arranged with even spacing in the rotational direction so that the angle between two in the rotational direction subsequent support members is essentially the same. Two subsequent support members form a kind of fork, the teeth-like protrusions of which define a pocket-like receiving space 10 where the logs being treated may be received and whereon they are supported. Further, the support members of an individual support member unit 28 are most suitably arranged on the same axial circumference in respect of the longitudinal direction of the axis 6. Thus the width of the support member, i.e. the transverse extension in respect of the advancing direction of the logs can be adapted as precisely as possible in respect of the width of the orifices 20 of the transportation level 2, in the front side 20a of the axis as well as in the back side 20b of the axis.

The rotational speed and rotational phase, i.e. phase angle of the support member units 28 are synchronized in respect of each other preferably so that the support member pairs in the unit 28, which always are at essentially the same phase angle, together form an elongated chute-like group extending essentially perpendicularly in respect of the advancing direction P of the logs, kind of receiving chute, wherein the logs being treated can be received.

When rotating around the axis of rotation, the support members 8 receive logs being discharged from the conveyor 34 when they advance upwards from the front side of the shaft 7 above the transportation level 2. When protruding upwards and advancing in the advancing direction P of the logs, the support members simultaneously limit the amount of logs 12 that are further discharged onto the level 2. In other words, in the rotational direction subsequent individual support members of the support member units prevent a larger amount of logs from squeezing into the individual receiving chute formed by said adjacent pockets. The rotational speed of the support members 8 is adjustable to be optimal in respect of the entering log amount so that at any time a desired amount of logs is allowed to set into the receiving space 10 formed by the support members.

When rising upwards from below the level 2, the support members 8 simultaneously lift from the front side of the shaft member 7 any logs that possibly have dropped through the orifice 20a of the transportation level back onto said transportation level 2. This ensures that logs possibly dropped through the orifices and possibly remaining in an upright position are not allowed to prevent the moving of the other logs and to cause blockage. Additionally, the front side of the shaft 7 is here provided with a counter wall 30, which is adapted close to the trajectory 22b of the tips 22 of the support members. By means thereof, logs possibly dropped through the transportation level are even more efficiently prevented from getting out of the control of the support members 8 into the space below the shaft 7.

Stones and other loose material, in their turn, are supposed to drop through the transportation level 2 and even in as early a stage as possible. Further, this way they cannot disturb the moving of the logs on the transportation level and their rolling and rubbing against each other. The loose material removed off the logs and dropped through the level 2 drops either directly in the collecting space 40 or remains first below the level especially ontop of the shaft member 7 and in the space between the shaft and the support members 8. As the support member further turns along with the rotating motion to point towards the collecting space 40 it finally drops down along the support member and rotates into the collecting space 40. The location of the shaft member 7 in respect of the transportation level 2 is preferably arranged so that even the biggest stones and other corresponding individual loose pieces dropped through the orifices 20 and remaining ontop the shaft 7 are prevented from extending above the transportation level and thus from hindering the movement of the logs on the transportation level.

The logs, in their turn, are supported and move forward in the pocket 10 formed by the support members 8 along with the rotating motion of the support members 8. Thus, the logs travel on the level 2 essentially perpendicularly in respect of the direction of motion P. Simultaneously they are ground both against each other and the support level and the support members and loose material is thus cleaned off the logs. At the same time, the individual logs settled in the pockets 10 in a more or less inclined position are aligned to be parallel with the other logs. After passing over the shaft 7, the cleaned logs in the pocket 10 travel further in the advancing direction P of the logs and finally exit the level e.g. to a subsequent conveyor not shown here.

The solution disclosed herein is made especially advantageous in that the support members 8, when supporting the transportation of the logs, simultaneously actively clean the construction of the transportation apparatus, specifically the transportation level 2 and in particular the orifices 20a, 20b between the support surfaces 4. All impurities, possible pieces of bark and other material often causing clogging in the transportation apparatus is seized by the support members 8 and passed through the orifices 20b into the space 40 below the axis.

In the following, some details of a highly advantageous embodiment of the invention according to FIG. 1 are explained in more detail. They are by no means meant for limiting the solution according to the present invention to these specific solutions, but to serve as an example of one highly advantageous practical embodiment of an approach according to the invention and its alternative details.

In the embodiment of FIG. 1, the width of the support members 8, i.e. transverse dimension in respect of the advancing direction of the logs has been arranged essentially wider than the support surfaces 4 contained in the transportation level. The arrangement may naturally be vice versa, but in the embodiment of FIG. 1 the proportion of the orifices 20 from the total surface area of the transportation level 2 is made as large as possible and the size of the individual orifices as such to be large. This further assists both the dropping of loose material through the level 2 and further minimizes the risk of clogging.

Thus, the transportation level is here formed by means of level members 44, between which the support member units 28 are located. In accordance with this kind of embodiment, as level members, which form the support surfaces 4 of the level, may serve e.g. flat bars, solid plates or corresponding, the upper edge of which is adapted to be part of the transportation level. The transportation level 2 is thus formed by the upper edges of these support bars or corresponding members. The upper edges together form an essentially even plane surface in respect of the supporting of the logs, along which the logs rotate, being supported in the pocket-like receiving spaces 10 formed by the support members. In this embodiment, the transportation level 2 formed by the level members 44 extends both in the feed side 14 and the discharge side 16 of the logs essentially further than the trajectory 22b of the support members' tips 22 at the transportation level.

On the other hand, the width of the support members 8 is adapted in respect of the orifices 20 so that they firstly fill in the lateral direction the orifices 20a in the front side of the axis of rotation 6, between the level members 44. In other words, the adaptation of the support members in the orifices of the transportation level is such that it as such efficiently prevents logs 12 from entering the space 40 below the axis via the front side of the rotational shaft 7. Additionally, a counter wall 30 is arranged below the transportation level 2 in the front side of the axes of rotation in a distance from the shaft 7 corresponding at least to the protrusion of the support members, which counter wall prevents logs from slipping via the front side of the support members into the space below the shaft 7. Further there is provided a counter bar or a corresponding member 38 in connection with each orifice 20 of the transportation level. Preferably the shape thereof is adapted to conform to the circumference 22b of the tip of the support member. This counter member acts as kind of counter surface in respect of the tip 22 of the support member. Correspondingly, the upper surface of the counter bar is preferably adapted to be part of the transportation level 2. The attachment of the above-mentioned members to both the apparatus 1 and in respect of each other may be arranged in known methods. Further, both the locations and the positions of the members may be arranged adjustable.

Figure 2:
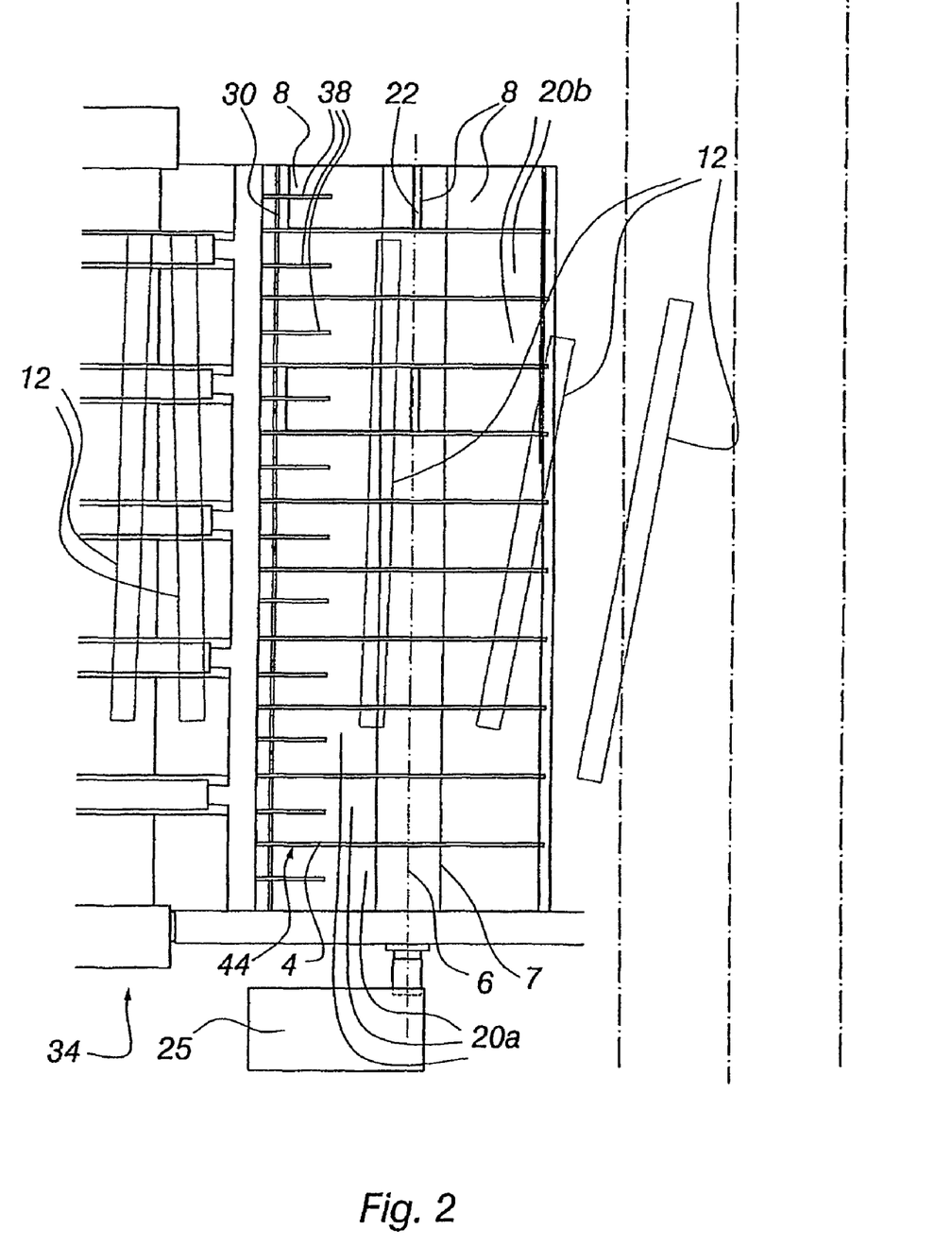
FIG. 2 illustrates the apparatus of FIG. 1 seen from above.

The positioning and dimensioning of the successive support members 8 are adapted both in respect of each other and in respect of the counter member 38 and the level members 44, as well as the counter wall 30 in such a way that as a preceding support member ascends to protrude above the transportation level 2, the subsequent support member has already reached the counter member 38. That is, the support members form in this embodiment a kind of spade-like member, which lifts up the logs possibly dropped through the orifices 20 in between the support surfaces, while the counter wall 30 simultaneously ensures that the logs cannot slip off from the support member. Thus, a kind of lock-feeder is formed at the same time. The adaptation of the support members in respect of the support surfaces 4 is especially well illustrated in FIG. 2. For clarity, most of the support members 8 have been omitted in the figure. Most preferably, support members 8 are arranged in each orifice 20 of the transportation level.

In addition to safe transportation of the logs and preventing them from dropping down, the apparatus disclosed herein simultaneously allows loose material to drop down via the transportation level 2 in as early a stage as possible. Additionally, any loose material slipped to the other side of the shaft 7 is with intensified efficiency forced through the transportation level through the orifices 20b into the collection space 40 escorted by the support members 40.

In this embodiment, the support members 8 are arranged in groups formed of a number of support members, which are positioned in the longitudinal direction of the shaft on the essentially same circumference of the shaft and at the same time at equal angles in respect of each other. Further, the support members here protrude from the shaft 7 with their thrust face 8a tangentially and with their support face 8b radially.

The thrust face 8a of a support member here refers to the side thereof directed towards the advancing direction of the logs, by means of which a pushing effect may be applied to the logs if needed for intensifying the transporting motion. The support face 8b, in its turn, refers to the surface of the support member facing the advancing direction of the logs, by means of which the logs received in the receiving space 10 are supported and also aligned and which also simultaneously serves as a constraint, a kind of controlling member, used for regulating the passage of the logs on the transportation level.

FIGS. 3a-3g and 4a-4d illustrate in a very schematical way some other embodiments of various parts of the apparatus disclosed herein for log treatment.

In the embodiment of FIG. 1, the transportation level 2 of the logs comprises support surfaces 4, which are formed of level members 44 directed parallel to the advancing direction of the logs. Most preferably, they have a small transverse extension in respect of the advancing direction of the logs and a straight shape, which ensure as precise an adaptation with the support members 8 as possible. Preferably the level members 44 are adapted in the vertical direction to conform to the trajectory of the boundary dimensions of the support members 8, i.e. the support members when rotating pass as close to the vertical side surfaces of the level members 44 as possible. Especially in the front side of the shaft 7 this in part prevents logs from entering the space below the shaft 7 and in general from getting stuck between moving parts and thus causing stoppages in the operation of the apparatus 1. Thus, the vertical side surfaces of the level members 44 form an essential part of the above-mentioned lock-feeder-type entity. The level members 44 are adapted to preferably extend at the shaft 7 downwards to the upper surface of the shaft and elsewhere even lower, as becomes apparent in FIG. 1.

The level members 44 may, however, be formed of also e.g. bar, pipes, flat bars or longitudinal profiles made of metals or other hard material, which are most preferably directed parallel to the advancing direction of the logs. Preferably the support surfaces are arranged in such a way that they define therebetween in the advancing direction of the logs an even space for the support member units. Naturally, a conceivable alternative is that a number of separate small-sized transportation level units are arranged side-by-side, wherebetween the support members are arranged rotatably. The most essential thing is, that the transportation level 2 provides the logs along its length with support points so that the movement of the logs along the surface of the transportation level is essentially supported.

Figure 4A:
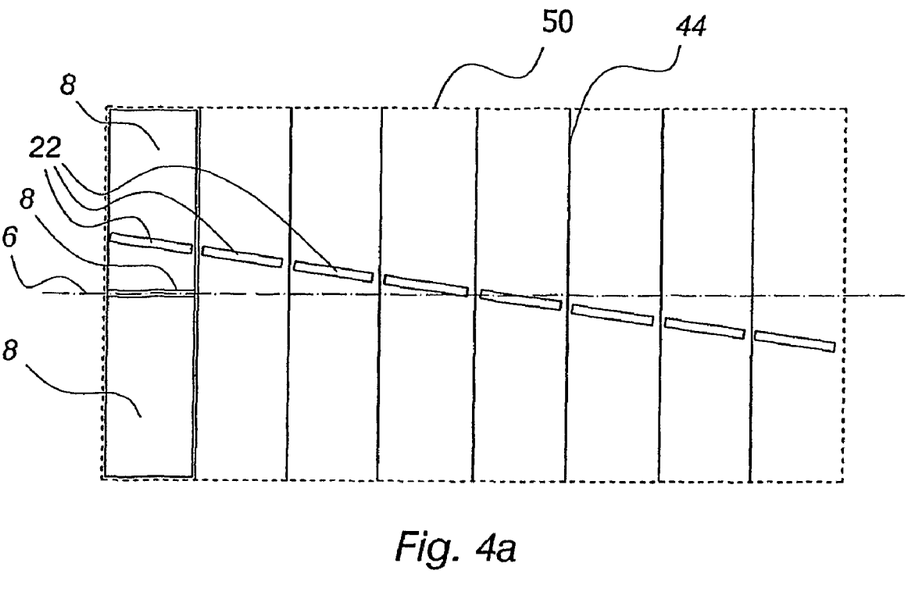
Figure 4B:
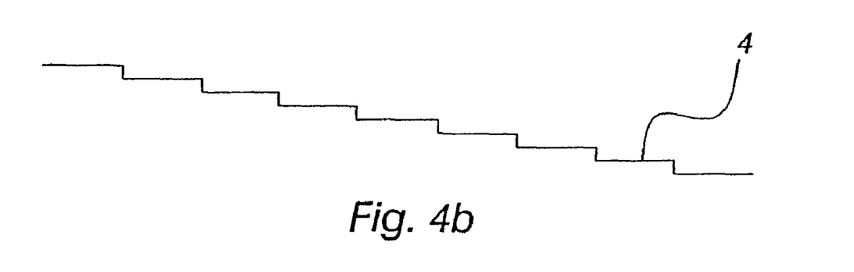
Figure 4C:
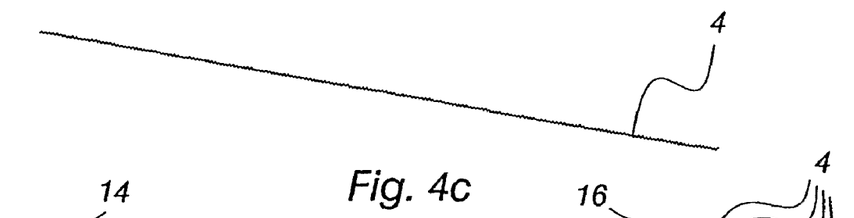

The support surfaces 4 may be either continuous, essentially non-interrupted surfaces or they may comprise sections or be interlocked e.g. in rows. The support surfaces may naturally be connected to each other fixedly e.g. by means of a common frame body 50, as shown in FIG. 4a. Also, for clarity only one support member group 28 is illustrated in FIG. 4a. By means of e.g. the common frame body 50 the whole transportation level 2 may be regulated or lifted in a centralized way, for instance for maintenance purposes.

The surface of the transportation level 2 may be arranged completely even in view of the transporting motion of the logs. However, the surface may as well be arranged to comprise irregularities, e.g. with steps or bumps as in FIGS. 4b and 4c. By means of a stepped or corresponding design of the transportation level, providing a desired vibration effect on the logs, the logs are forced to rotate, or at least their rotation is boosted, around their longitudinal axis on the transportation level of the logs, and as a whole, an intensified vibration effect may be applied on the logs. Simultaneously any loose material on the logs falls off more easily. In an embodiment, the transportation level is in the advancing direction of the logs arranged to be suitably convex, whereby the convexity may simultaneously be adapted to conform to the trajectory 22b of the tips of the support members. In this way, the angle of the support member 8 in respect of the transportation level is more apt to remain constant along the distance when the support member protrudes above the level. The transportation level 2 may also be curved or suitably partly curved.

Figure 4D:
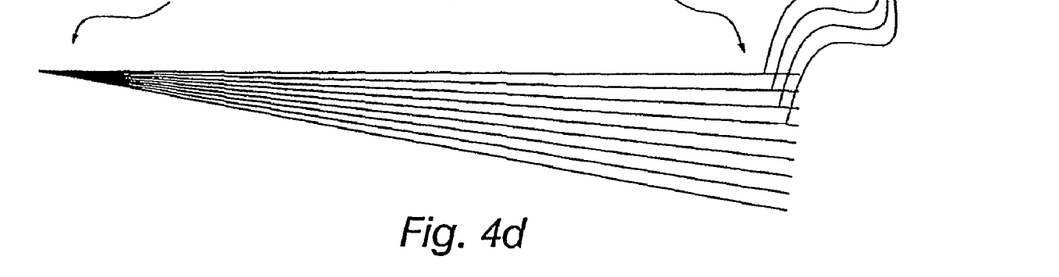

According to an embodiment, the support surfaces of the transportation level 2 are further arranged to be adjustable, especially in vertical direction and specifically independently of each other. By adjusting individual parts of the support surface independently and differently from each other, e.g. by lifting one edge zone of the support surface, as illustrated in FIG. 4d, the adjustment also provides for a lateral inclination of the support level for desired guiding or aligning of the logs. This makes it possible to guide the logs, e.g. to ensure that a desired end of the log always or at least almost always drops first to a conveyor or other device following the processing apparatus 1. To put it differently, the appropriate orientation of the logs on the subsequent device is ensured. Likewise, the aligning of the logs, which have settled in one way or another crosswise on the transportation level, may be acted upon in a desired way by the inclination of the transportation level. In the same connection, mutual synchronizing of the support member units may also be utilized, e.g. so that the rotation angle i.e. phase angle of the support member units changes in the lateral direction in respect of the advancing direction of the logs, as shown in FIG. 4a. Thus, an intensified turning effect can be applied on the logs in their longitudinal direction.

An advantage of the solution disclosed herein for log treatment is also the possibility to utilize a significantly minor slope i.e. inclination of the transportation level formed of the support surfaces 4 in the advancing direction of the logs, compared to that of current solutions such as e.g. a grid ramp. Especially, by utilizing support members for the shafts rotating the support member units, which support members are provided with a separate drive and formed in a suitable way it is also possible to totally omit the slope of the grid. In other words, inclination of the grid based on utilization of gravity is not necessary, but the transportation of the logs takes place solely by means of the support members 8. It is even conceivable that in special embodiments the transportation level is arranged at an ascending angle in the advancing direction of the logs.

The axis of rotation 6 for the support members is preferably designed as a rigid and elongated mounting rotatable around its longitudinal axis, more precisely, as a shaft member 7. Each support member unit may optionally be arranged on either a dedicated or a common axis of rotation. When a physical shaft member is used, this may be arranged either in form of a single shaft for all the support member units or as several subsequent shafts transversely in respect of the transportation direction P. Most preferably though, the subsequent shafts are arranged coaxially. In the above embodiment according to FIG. 1, the axis 6 is formed of a single stationary shaft member 7, to which all the support member units are attached.

A stationary shaft member combining two or more adjacent support member units may be formed by means of e.g. a pipe, a roll, a cylinder, a beam or a corresponding essentially rigid construction, to which said support members may be attached utilizing conventional technique either detachably or fixedly. Additionally, it is possible to arrange the location and position of the support members to be adjustable in respect of the shaft.

As in the embodiment of FIG. 1, a drive 25 may be provided for the shaft 7 e.g. on one end or both ends thereof. The rotational speed of the shaft may be regulated if needed e.g. by means of an inverter. Preferably, both the position and the location of the shafts are adjustable in respect of the transportation level. This way it is possible to influence e.g. the amount of logs received in an individual pocket-like space 10, the position and motion of the support members in respect of the transportation level and the behavior of the logs in respect of the support members. The position of the shaft is adjusted depending on e.g. transportation speed, the size and amount of the logs, the rotational speed and adjusted position of the support members. When several subsequent shaft members are used, the adjustment of the location of the shafts may also contribute to the guiding of the logs on the transportation level, especially together with the adjustment of the transportation level itself.

The rotational speed of the axis and thus also the rotational speed of the support members may also be arranged adjustable in a desired way. The rotational speed of the axis of rotation is adjustable e.g. depending on the speed of the preceding conveyor, the amount of incoming logs and their position, the desired amount of logs for the following device. The circumferential speed of the support members' tips is most preferably greater than the speed of the feeding conveyor. Preferably said circumferential speed is in the range of 1:1-5:1, most preferably in the range of 3:1-4:1 in respect of the feeding conveyor. Here, the speed of the conveyor refers especially to the advancing speed V of the logs being transported on a conveyor, e.g. a belt conveyor or a chain conveyor. The transportation speed of the logs and the circumferential speed of the support members may additionally be arranged adjustable either in the same proportion or alternatively independently of each other.

By decelerating the rotational speed of the axis and thus that of the support members, it is conceivable to regulate the amount of logs being dosed in the pockets of the support members and, further, the log flow amount being fed forward. Additionally, it is conceivable to also contribute to the aligning of the logs utilizing the rotational speeds of the support members, if desired. Preferably the support members are rotatable also backwards, if needed in various exceptional situations. In case of a possible blockage, this may e.g. expedite the repair of the malfunction.

Further, if the sloping angle of the transportation level is arranged sufficiently wide, the logs can be transferred forward greatly by means of gravity only, i.e. a separate drive for rotating the support members is not necessary needed.

FIGS. 3a-3g illustrate some embodiments of the support members 8. In respect of the axis of rotation 6, the support members are elongated protrusions, whereby between two in the rotational direction adjacent support members a pocket-like receiving space 10 is formed for receiving the logs 12 being processed. Preferably the support members are arranged to extend from the shaft essentially radially or tangentially. The attachment of the support members to a mounting, that is, most preferably to a fixed shaft construction 7 common to a number of support member units, can be effected by prior art methods e.g. by bolt joints or welding.

Figure 3A:
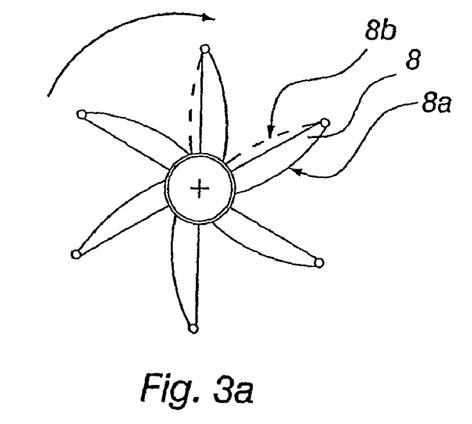
FIGS. 3a-3g are highly schematic illustrations of exemplary embodiments of the support member units in side views.
Figure 3B:
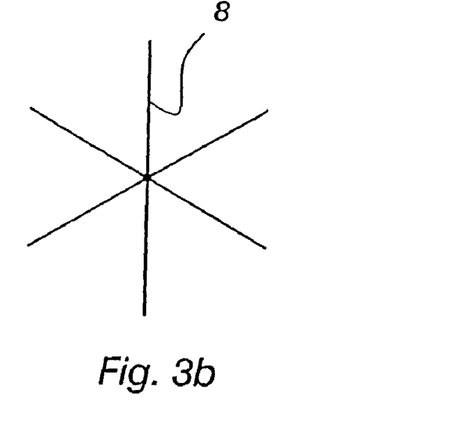

The support member itself can be formed as a bar-like or a box-like member e.g. of two plates by welding them together by means of appropriate adjoining pieces. One opportunity is to use support members adjoined to each other in a star-formed pattern, as in FIGS. 3b and 3e. Thereby, the actual shaft member itself may be totally omitted. This pattern is especially conceivable in case of a rod-like or plate-like support member embodiment. As in FIG. 3e, the support members may be arranged attachable to each other firstly without a separate shaft member and after that as a unit to be connected to a shaft or a corresponding rotational center point. It is also essential to note that even two, if not even more support members may be formed by means of one piece. In that case the piece is adapted to the axis of rotation most preferably at the center point thereof, as can be seen in FIG. 3b.

The mutual angle between two subsequent support members arranged in an individual support member unit is preferably between 30°-180°, most preferably between 45°-90°. This mutual angle may be arranged adjustable depending on e.g. the amount and the size of the logs, the rotational speed or an optional parameter. Preferably, the support members are positioned in respect of both each other and the level members 44 and the counter wall 30 in such a way that the logs are not allowed to drop down from the front side of the axis 6. Between two in the rotational direction subsequent support members is thereby formed a lock-feeder type pocket. It is of essence to notice that two in the rotational direction subsequent support members 8 forming the receiving space 10 do not necessarily have to be arranged in one and the same support member unit, but an individual receiving space 10 may be formed of e.g. two individual support members of two adjacent support member units 28. The first support member in the first support member group precedes the second support member in the second support member group by a phase angle corresponding to the size of the receiving space.

Figure 3C:
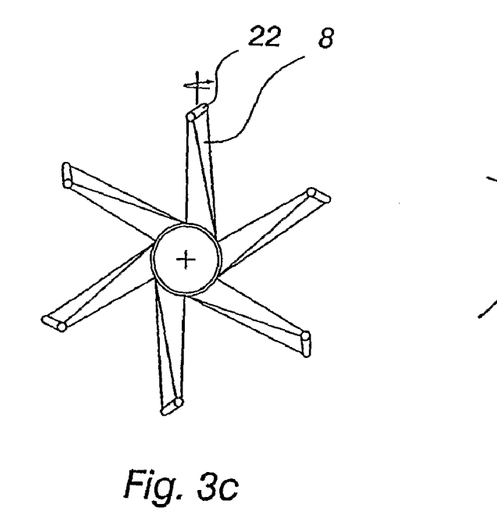
Figure 3D:
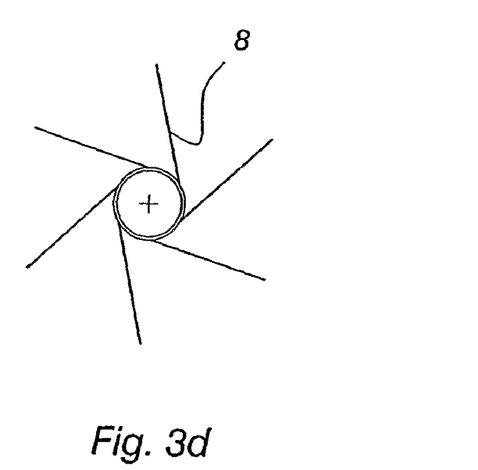
Figure 3E:
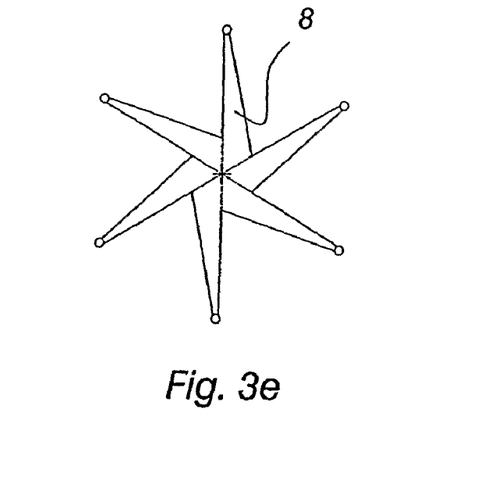

The position of the support members in respect of the adjacent other support members of the support member units can preferably be either synchronized to be the same or adjusted independently, e.g. for aligning or guiding the logs. Most suitably the pockets formed by the support members are all in the same angle phase, i.e. the pockets form in the crosswise direction the above-described receiving chute. Also, it is possible to arrange the adjustment in such a way that in each case the phase angle between two adjacent support member units changes slightly, so that a receiving chute sloping in respect of the axis 6 is formed. This is illustrated in FIG. 4a. In this way, it is possible to direct the logs always to a certain angle for the following conveyor or device, especially for a belt conveyor or a corresponding conveyor, in which the logs are transported in their longitudinal direction. The guiding of the logs may be made more efficient by arranging each support member twisted around its longitudinal axis, as shown in FIG. 3c. The angle of the twist of the tip 22 is in respect of the direction of motion of the support members preferably adapted to correspond to the above-mentioned sloping of the receiving chute in respect of the axis 6, which is illustrated in FIG. 4a. Likewise, it is possible to affect the directioning of the logs utilizing adjustment of the support surfaces 4. The support surfaces may be arranged to slope step-wise e.g. towards a certain angle of the transportation level. This is illustrated in FIG. 4d, where the downward sloping of the support surfaces in the direction of the discharge side 16 increases towards the other edge of the transportation level 2.

By additional forming of the support surfaces 8a and 8b of the support members it is possible to advantageously affect the guiding and supporting of the logs. This is illustrated in FIG. 3a. The thrust face 8a, i.e. the front surface of the support member in the direction of motion of said support member is most preferably convex in its longitudinal direction. This contributes to the departure of the logs from the transportation level in the latter end of the apparatus, especially if the sloping angle of the transportation level is very small or even negative. Similarly, the support surface 8b, i.e. the surface onto which the logs are supported in the downward slope, is most preferably direct or even slightly convex, as shown in dotted line. This also facilitates the discharge of the logs from the transportation level when the support member finally turns from the orifice members below the level 2, hiding off from the passage of the logs.

Figure 3F:
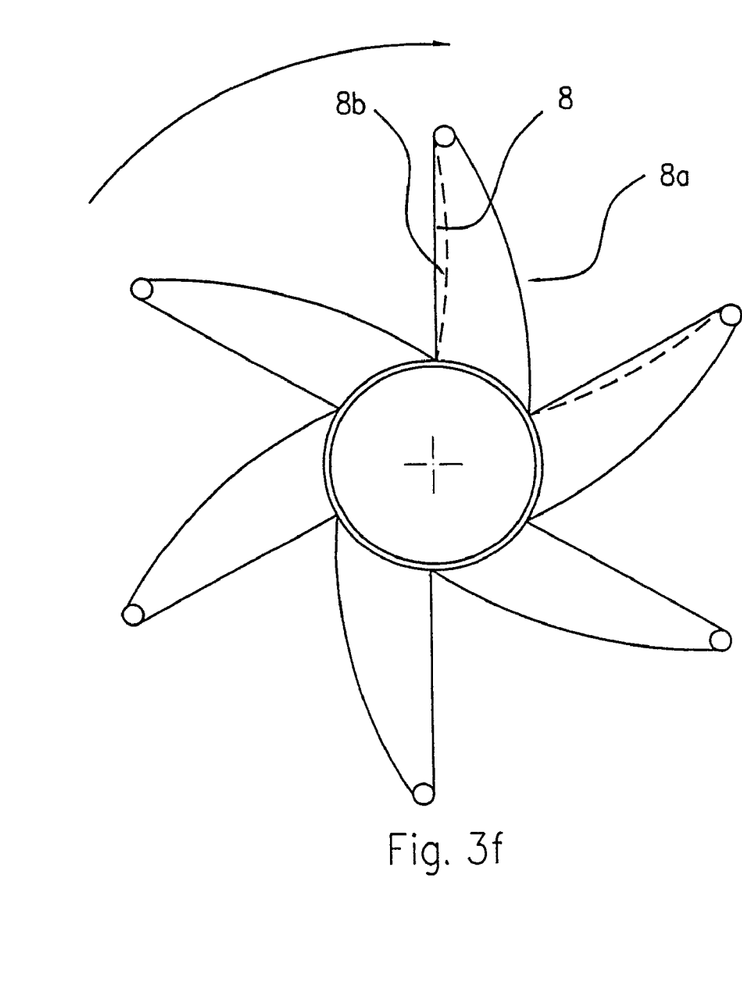
Figure 3G:
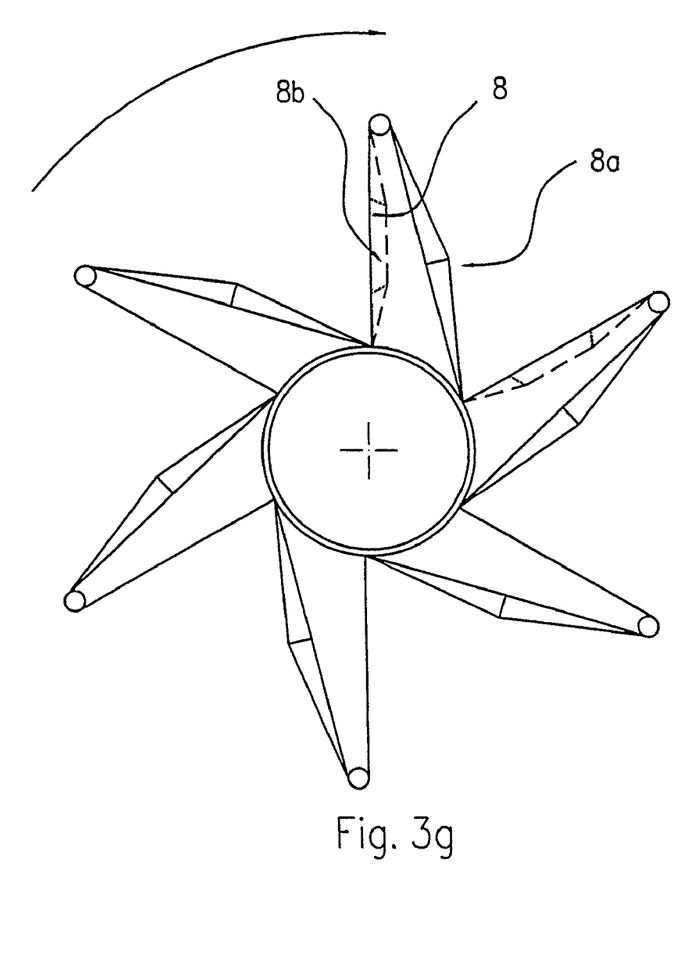

Illustrated in FIG. 3f, at least the support surface 8b of the support members 8 is concave-like, whereby the support member has a cup-like shape. Both or one of the support surfaces 8a and 8b can be concave or it can also be formed of two or more essentially straight parts. One or both of the support surfaces, especially support surface 8a, can also be convex or consist convex-like of two or more essentially straight parts connected to each other, as illustrated in FIG. 3g. A concave or cup-like shape of the support member 8 offers the advantage that the support point 24 may be moved lower, whereby the logs drop off more easily and the blocking of the apparatus is avoided, while stones are nevertheless not allowed to drop off with the logs but remain in the concave-like support member for an adequately long period.

In FIG. 1, the support member 8 is formed as a wide wing- and beam-like member. This kind of wing-like support member may be manufactured e.g. by welding two plates together using appropriate adjoining pieces, thus forming a box-like structure.

Additionally, the tip 22 of the support member 8 is preferably rounded. A round tip portion may be arranged in the tip 22 of the support member e.g. by welding or other prior art method. The tip part itself may be formed of e.g. a pipe, a round bar, a shaft or corresponding. By the design of the support member's tip 22 the moving of the logs is facilitated so that the logs are made to settle in the receiving pocket in the direction of the longitudinal axis. Although the present apparatus 1 is supposed to receive the logs in respect of the advancing direction in an essentially perpendicular position, i.e. the logs are transported laterally in respect of their longitudinal axis, it is possible that individual logs settle onto the transportation level 2 and the receiving pockets 10 in an inclined direction. If a log is or goes onto e.g. an individual support member, it will nevertheless stay on the round-formed tip, but one end of the log will drop down. Similarly, a log left onto a support member can be "dumped" over the support member in the pocket subsequent in the rotational direction, when the center of gravity of the log transfers towards the advancing direction as the support members continue their rotation around the axis. Thus, by means of the apparatus 1, the logs may be aligned to be parallel prior to feeding them to the following device or conveyor.

By means of formation of the support member's tip 22 it is also possible to contribute to the cleaning of the apparatus itself, especially the removing of pieces of bark and corresponding from the apparatus. A counter edge 24 according to FIG. 1 may be utilized. In the embodiment of FIG. 1, the tip 22 is adapted in relation to the counter edge 24 so that the tip 22 cuts the pieces of bark etc. possibly left on the counter edge. This further decreases clogging. The counter edge does not necessarily have to be a blade as in FIG. 1. It may also be round-shaped, such as the tip 22, e.g. a pipe or a round bar, or have a curved shape. Thereby pieces i.e. especially bark, remaining between the tip 22 and the counter edge 24, are carried away with the support member's tip 22 and passed further into the collecting space 40. The counter edge is preferably positioned so that logs leaving the transportation level are prevented from hitting onto it. Other members for cleaning purposes are also conceivable in connection with or instead of the counter edge, or, in some cases, the counter edge may preferably be totally omitted, too.

The transportation level 2 extends preferably further than the trajectory 22b of the support members' tips both in the feed side and the discharge side. It is, however, also conceivable that in special applications the support members' tip 22 extends either in the feed or the discharge side or both further than the transportation level. Also conceivable is an embodiment, in which the trajectory 22b extends in the advancing direction of the logs further than the surface 4 of the transportation level itself.

Further, it is conceivable that the support members are provided with additional members, e.g. bristles for boosting the cleaning function. Likewise it is conceivable to arrange additional cleaning of the support members themselves, e.g. below the transportation level 2. The efficiency of the cleaning of the logs may preferably be further increased e.g. by means of water jets positioned above the orifice members.

The support members 8 are additionally arranged to perform a rotary motion above the transportation level 2. Thus, the axis 6 may be arranged either additionally or solely above the level 2. In another further embodiment the logs are fed to the level 2 in their longitudinal direction and fed thereafter by means of the support members over the level 2 in their crosswise direction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A apparatus for cleaning and transporting logs comprising:
   a transportation level extending generally in an advancing direction (P) of the logs, over which transportation level the logs are arranged to travel in a position essentially perpendicular to their advancing direction (P) and which transportation level includes orifice members penetrating through the level;
   wherein below the transportation level, at least two support member units are spaced from each other and arranged in a direction essentially perpendicular to the advancing direction (P) of the logs, whereby each individual support member unit includes at least one elongated support member arranged rotatably around an axis of rotation positioned essentially parallel to the transportation level and essentially perpendicular to the advancing direction (P) of the logs and which extends therefrom, and said axis of rotation of each of the support member units is arranged with respect of the transportation level so that when rotating around the axis of rotation, at a certain phase angle area of said rotational motion the support members protrude through the orifice members above the transportation level,
   whereby the logs are received into one or several receiving spaces formed between the support members protruding above the transportation level and being at different phase angles in respect of each other and the logs are transported in said one or several receiving spaces further in the advancing direction (P) of the logs, whereby the logs are simultaneously ground against each other and the support level and the support members and loose material is thus cleaned off the logs and drops through the transportation level and the support members simultaneously cleaning the construction of the transportation apparatus actively keeping the grid orifices clean and carrying the loose material away.

2. An apparatus for cleaning and transporting logs comprising:
  a transportation level extending essentially in the advancing direction (P) of the logs, over which the logs are arranged to be transported in a position essentially perpendicular to their advancing position, and which transportation level is provided with orifice members protruding therethrough;
  at least two support member units are spaced from each other are arranged below the transportation level in an essentially perpendicular direction with respect to the advancing direction (P) of the logs, of which each individual support member unit comprises at least one elongated support member arranged rotatably around an axis of rotation essentially parallel to the transportation level and essentially perpendicular to the advancing direction (P) of the logs and to protrude therefrom,
  and that said axis of rotation of each support member unit is adapted in respect of the transportation level so that when rotating around the axis of rotation, the support members protrude through the orifice members above the transportation level in a certain phase angle area, whereby the logs may be received in one or more receiving spaces formed between the support members protruding above the transportation level and being at different phase angles in respect of each other, and transported in said one or more receiving spaces further in the advancing direction (P) of the logs whereby the logs may simultaneously be ground against each other and the support level and the support members and loose material may thus be cleaned off the logs and drop through the transportation level and the support members may simultaneously clean the construction of the transportation apparatus actively keeping the grid orifices clean and carrying the loose material away.

3. The apparatus according to claim 2, wherein the receiving space is formed between two, in the rotational direction, subsequent support members of an individual support member unit.

4. The apparatus according to claim 2 wherein the transportation level is formed by at least two elongated support surfaces, which extend essentially in the advancing direction (P) of the logs, whereby the orifice member is formed between two support surfaces adjacent, in the direction transverse to the advancing direction (P), of the logs and via which orifice member the support members of each support member unit can be adapted to protrude above the transportation level.

5. The apparatus according to claim 2 wherein the orifice members extend essentially in the advancing direction (P) of the logs.

6. The apparatus according to claim 2 wherein the transportation level is partly curved.

7. The apparatus according to claim 2 wherein the transportation level is curved.

8. The apparatus according to claim 2 wherein the axis of rotation of a plurality of support member units is arranged to be essentially coaxial with the other axes of rotation.

9. The apparatus according to claim 2 wherein the number of support member units is greater than two and that the rotational speed of the support members of each support member unit is adjustable with respect of the other support member units.

10. The apparatus according to claim 2 wherein the support members of each support member unit are attached to an axis of rotation formed as a mounting, and comprising a rigid, elongated shaft member extending essentially transversely in respect of the advancing direction (P) of the logs.

11. An apparatus according to claim 2 wherein an angle (A) between two, in their rotational direction, subsequent support members of an individual support member unit is between 30°-180°.

12. The apparatus according to claim 2 wherein the support member units are arranged in each orifice of the transportation level.

13. The apparatus according to claim 2 wherein the support members are dimensioned to the orifice members so that logs are essentially prevented from getting through the transportation level.

14. The apparatus according to claim 2 wherein the member units are adapted in the advancing direction (P) of the logs subsequently overlapping adjacent to each other.

15. The apparatus according to claim 2 wherein said spacing between two adjacent support member units is less than a length of the logs being processed.

16. The apparatus according to claim 2 wherein the support members are at least one of rod-like or plate-like in shape.

17. The apparatus according to claim 2 wherein a form of a support surface of the support member is convex.

18. The apparatus according to claim 2 wherein a form of the support surface of the support member is concave.

19. A log transport device comprising:
  a log transport surface inclined downwardly along a substantially straight path from an log inlet towards a log discharge along an advancing direction of the logs, the transport surface includes gaps or openings through which debris falls as the logs move over the transport surface;
  an arrangement of rotating support members arranged transverse to the transport surface and each support member includes a rotatable shaft portion positioned entirely underneath the transport surface and support member arms each extending outward from the shaft portion from a different angular position on the shaft portion;
  wherein, as the shaft portion rotates, the support member arms cyclically rotate up through one or more of the openings, extend above the transport level, drop down through the one or more openings and extend below the transport level, and
  wherein, as the shaft portion rotates and the logs remain on and move down the transport surface, logs moving over the transport surface are sequentially received into a gap between adjacent ones of the support member arms, the logs continue to move on the transport surface while in the gap and to the log discharge.

* * * * *